3,369,968
COMPOSITION AND METHOD OF ABSORBING
GAS IN THE INTESTINE
Walton J. Smith, 410 E. 57th St., New York, N.Y. 10022
No Drawing. Filed Dec. 3, 1963, Ser. No. 327,842
4 Claims. (Cl. 167—55)

The present invention pertains generally to the use of magnesium hydroxide or magnesium oxide to react with carbon dioxide in the intestinal tract to form magnesium carbonate. Included in the present invention are novel means and methods of providing relief from discomfort due to abnormal or excessive quantities of carbon dioxide gas in the intestinal tract, without laxative action associated with the administration of magnesium containing antacids.

It is well-known that the stomach becomes acid as gastric juice containing hydrochloric acid is secreted into it. When this acid juice, mixed with foods, enters the duodenum, it is neutralized with fluid containing sodium bicarbonate. The free acid and the bicarbonate form carbonic acid which has limited stability, especially at body temperature in body fluids, and some carbon dioxide gas forms, sometimes resulting in discomfort. Carbon dioxide gas when formed by fermentation of carbohydrates in the intestinal tract adds to the discomfort. See my copending application directed to the treatment of flatulence in people, Ser. No. 318,821, filed Oct. 25, 1963. The present invention covers means of decreasing the flatulence caused by the additional gas released by the neutralization process in the duodenum as well as by fermentation gas.

Many so-called antacids have been marketed and are on the market for the purpose of neutralizing acidity in the stomach. One of these, which has been available for decades, is aqueous magnesium hydroxide sold in the form of Milk of Magnesia for antacid and laxative purposes. Some laxative action is always involved in products of this type as the magnesium hydroxide reacts with the hydrochloric acid in the stomach to form the readily soluble magnesium chloride, which in turn has a laxative effect as it moves down the intestinal tract. In view of this, when antacid action only is desired and laxative action is contra-indicated, the use of Milk of Magnesia or the like is obviously also contra-indicated. This also applies when undesirable side reactions are encountered due to partial absorption of the water-soluble magnesium salts formed, for example, upon oral administration of antacids such as magnesium hydroxide or oxide.

In investigations in this field it was discovered that flatulence caused by the generation of carbon dioxide in the intestinal tract can be controlled, without any substantial laxative action, by the administration of enteric coated dosage units, e.g. tablets, capsules, pills and the like, containing magnesium hydroxide or magnesium oxide or mixtures of the same. The enteric coating used should be of the commercially available conventional types which release the medicament in the intestinal tract after passage through the stomach. Enteric coatings of the preferred type, of which cellulose acetate phthalate, is illustrative, do not release the medicament until the intestinal fluid is free or substantially free from available hydrochloric acid, e.g. do not release the medicament until the pH of the intestinal fluid is at least about 5.5–6 or higher.

Commercially available magnesium hydroxide and magnesium oxide can be used in the enteric coated dosage units of the present invention. Their reaction with the carbon dioxide gas, however, may be somewhat retarded or not as rapid as desired in some cases, due to the fact that the pH of the fluids in the duodenum and lower intestinal tract is for the most part nearly neutral.

In continued investigations in this field, it was discovered that a highly reactive finely divided dry magnesium hydroxide product could be obtained by drying aqueous magnesium hydroxide, i.e. magnesia magma, in the frozen state. The resulting freeze-dried magnesium hydroxide product retains most of original reactivity of the magma and is preferred for use in the enteric coated dosage units of the present invention.

The freeze-dried magnesium hydroxide product, due to its high activity, can also be used to advantage where desired as a simple antacid or laxative in dosage unit form without the enteric coating. The highly reactive freeze-dried product, for example, can be sealed in strips, either foil or transparent, in antacid or laxative doses. The dosage units, which can be flavored, can be administered as such or added to water to make an "instant" Milk of Magnesia type product. Both the enteric coated products and the freeze-dried product have an advantage over liquid products in that they pose no freezing problem during transportation in winter.

The following examples will serve to illustrate the invention.

EXAMPLE I 100 grams of magnesia magma, e.g. made up of about 30% $Mg(OH)_2$ and 70% $H_2O$, is frozen in a flask suspended in an acetone-Dry Ice mixture. After completely frozen, the flask is removed from the freezing mixture and a high vacuum applied so that the magma dries from the frozen state without melting. After completely dry, the vacuum is disconnected. The resulting freeze-dried magnesium hydroxide product is next tabletted by conventional means with starch and lactose or like pharmaceutical diluents along with binders and lubricants to form compressed tablets containing about 0.5 gm. of magnesium hydroxide per tablet. The tablets are then finally enteric coated with cellulose acetate phthalate or other suitable enteric coating so that when administered orally the intestinal fluid does not reach the tablet contents until the pH of the fluid is at least about 5.5–6 or higher, i.e. when there is substantially no free HCl present in the fluid.

EXAMPLE II

This example is in accordance with Example I, except that commercial magnesium hydroxide (NF) is used in place of the freeze-dried magnesium hydroxide product. As in Example I, the tablet is enteric coated to provide for the release of the magnesium hydroxide after the pH of the intestinal fluid reaches at least about pH 5.5–6.

EXAMPLE III

This example is in accordance with Example II, except that magnesium oxide is used in place of magnesium hydroxide.

EXAMPLE IV

This example is in accordance with Example I, except that the tablet containing the freeze-dried magnesium hydroxide product is not enteric coated. With tablets of this type, the dose as an antacid is 1–2 tablets and the dose as a laxative is 3–4 tablets.

EXAMPLE V

In this example, the freeze-dried magnesium hydroxide product of Example I, without tabletting, is packaged in individual packets or dosage units to be added to water to make "instant" Milk of Magnesia. For antacid, each packet or dosage unit can contain about 0.6 gm. of the freeze-dried magnesium hydroxide product and for laxative action each packet or dosage unit can contain about 1.5 gms. of the freeze-dried product.

It will be apparent from the above that the enteric coated dosage units of the present invention remove the flatulence-causing gases through the intestine as magnesium carbonate in solid form. It also will be apparent from the above that as the dosage units disintegrate and release the magnesium hydroxide or oxide medicaments only after the pH of the intestinal contents are above the value where available hydrochloric acid would be negligible, no significant amounts of soluble magnesium compounds form. This last feature as noted above, is important where side effects caused by absorption of magnesium are to be avoided and laxative action is contraindicated.

I claim:

1. An enteric coated dosage unit containing as an essential ingredient a medicament selected from the group consisting of magnesium hydroxide and magnesium oxide in an amount sufficient to provide relief from discomfort due to excessive carbon dioxide in the human intestinal tract, said enteric coating being an enteric coating which will release the medicament in the intestinal tract when the intestinal fluid is substantially free from hydrochloric acid.

2. A dosage unit in accordance with claim 1, where the medicament is freeze-dried magnesium hydroxide and the enteric coating does not release the magnesium hydroxide in the intestinal tract until the intestinal fluid reaches a pH of at least about 5.5–6.

3. The method of providing relief from discomfort due to excessive carbon dioxide in the intestinal tract without laxative action which comprises orally administering to persons an enteric coated tablet containing as an essential ingredient a medicament in an effective amount selected from the group consisting of magnesium hydroxide and magnesium oxide, said enteric coating being an enteric coating which will release the medicament in the intestinal tract when the intestinal fluid is substantially free from hydrochloric acid.

4. A dosage unit adaptable for use as an antacid and laxative consisting essentially of magnesium hydroxide prepared by freeze-drying Milk of Magnesia.

References Cited

UNITED STATES PATENTS

| 2,552,360 | 5/1951 | Zichis | 167—78.5 |
| 3,081,233 | 3/1963 | Enz | 167—82.5 |
| 3,094,464 | 6/1963 | Joullie | 167—82.5 |

OTHER REFERENCES

U. S. Dispensatory, 25th edition, 1955, Lippincott Co., Philadelphia, Pa., pp. 775 and 776.

SAM ROSEN, *Primary Examiner.*

JULIAN S. LEVITT, *Examiner.*